United States Patent
Lobert

(10) Patent No.: US 10,297,812 B2
(45) Date of Patent: May 21, 2019

(54) TERMINALS OF AN ELECTROCHEMICAL CELL

(71) Applicant: Johnson Controls Technology Company, Plymouth, MI (US)

(72) Inventor: Jonathan P. Lobert, Hartford, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 317 days.

(21) Appl. No.: 15/210,635

(22) Filed: Jul. 14, 2016

(65) Prior Publication Data

US 2018/0019459 A1 Jan. 18, 2018

(51) Int. Cl.

| | |
|---|---|
| *H01M 2/30* | (2006.01) |
| *B60K 1/04* | (2019.01) |
| *B60R 16/033* | (2006.01) |
| *H01M 2/02* | (2006.01) |
| *H01M 2/06* | (2006.01) |
| *H01M 2/20* | (2006.01) |
| *H01M 2/22* | (2006.01) |
| *H01M 10/0525* | (2010.01) |
| *H01M 10/052* | (2010.01) |

(52) U.S. Cl.
CPC ............... *H01M 2/305* (2013.01); *B60K 1/04* (2013.01); *B60R 16/033* (2013.01); *H01M 2/024* (2013.01); *H01M 2/0262* (2013.01); *H01M 2/0285* (2013.01); *H01M 2/06* (2013.01); *H01M 2/206* (2013.01); *H01M 2/22* (2013.01); *H01M 2/307* (2013.01); *H01M 10/052* (2013.01); *H01M 10/0525* (2013.01); *B60K 2001/0411* (2013.01); *H01M 2220/10* (2013.01); *H01M 2220/20* (2013.01)

(58) Field of Classification Search
CPC ......... H01M 2/24; H01M 2/305; H01M 2/307
USPC .......................................................... 429/65
See application file for complete search history.

(56) References Cited

U.S. PATENT DOCUMENTS

| | | |
|---|---|---|
| 9,240,576 B2 | 1/2016 | Kugino et al. |
| 2006/0051665 A1 | 3/2006 | Rigobert et al. |
| 2010/0143786 A1 | 6/2010 | Kim |
| 2011/0305943 A1* | 12/2011 | Byun .................... H01M 2/043 429/178 |

(Continued)

OTHER PUBLICATIONS

PCT/US2017/040951 International Search Report and Written Opinion dated Sep. 13, 2017.

*Primary Examiner* — James M Erwin
(74) *Attorney, Agent, or Firm* — Fletcher Yoder, P.C.

(57) ABSTRACT

An electrochemical cell includes a cell element and a casing configured to receive the cell element, the casing having a wall with a first terminal opening. The electrochemical cell includes a first terminal having a terminal post extending through the first terminal opening along a longitudinal axis of the terminal post, a first gasket extending into an interior of the casing and disposed radially between the terminal post and the wall to electrically insulate the terminal post from the wall, a second gasket extending exterior to the casing, positioned axially adjacent to the first gasket with respect to the longitudinal axis, and disposed radially between the terminal post and the wall to electrically insulate the terminal post from the wall, and a press ring disposed exterior to the casing and radially between the second gasket and the terminal post. The electrochemical cell also includes a second terminal.

25 Claims, 7 Drawing Sheets

(56) References Cited

U.S. PATENT DOCUMENTS

| | | | |
|---|---|---|---|
| 2012/0156548 A1* | 6/2012 | Kim | H01M 2/0237 |
| | | | 429/158 |
| 2013/0115493 A1 | 5/2013 | Fuhr et al. | |
| 2015/0030893 A1 | 1/2015 | Mack et al. | |
| 2015/0086867 A1* | 3/2015 | Oda | H01M 2/206 |
| | | | 429/211 |

* cited by examiner

TERMINALS OF AN ELECTROCHEMICAL CELL

BACKGROUND

The present disclosure relates generally to the field of batteries and battery modules. More specifically, the present disclosure relates to terminals of an electrochemical cell.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous systems employ battery technology, such as automobiles, stationary battery systems, and so forth. A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

In addition to use in vehicles (e.g., cars, boats, trucks, motorcycles, airplanes), advances in battery technology and rechargeable batteries are more frequently being used it what may be referred to as stationary battery applications. Applications for stationary batteries, which are often used in backup or supplemental power generation, are becoming more widespread with improvements in rechargeable aspects of batteries and with the lowering of prices for such technology. For example, stationary batteries may be utilized for industrial and/or household applications. Such applications may include DC power plants, substations, back-up power generators, transmission distribution, solar power collection, and grid supply.

As technology continues to evolve, there is a need to provide improved power sources, particularly battery modules and electrochemical cells, for such vehicles. For example, traditional configurations of electrochemical cells may include bulky or cumbersome terminals. Accordingly, improved terminals of an electrochemical cell are desired.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In accordance with a first embodiment, an electrochemical cell includes a cell element and a casing configured to receive the cell element. The casing includes a wall with a first terminal opening. The electrochemical cell also includes a first terminal in electrical communication with a first electrode of the cell element and configured to interface with the first terminal opening. The first terminal includes a terminal post extending through the first terminal opening along a longitudinal axis of the terminal post, a first gasket extending into an interior of the casing and disposed radially between the terminal post and the wall of the casing with respect to the longitudinal axis to electrically insulate the terminal post from the wall, a second gasket extending exterior to the casing, positioned axially adjacent to the first gasket with respect to the longitudinal axis, and disposed radially between the terminal post and the wall of the casing with respect to the longitudinal axis to electrically insulate the terminal post from the wall, and a press ring disposed exterior to the casing and radially between the second gasket and the terminal post with respect to the longitudinal axis. The electrochemical cell also includes a second terminal in electrical communication with a second electrode of the cell element.

In accordance with a second embodiment, a lithium-ion battery module includes lithium-ion electrochemical cells. Each lithium-ion electrochemical cell includes a housing configured to receive a cell element and a lid configured to enclose the cell element within the housing, where the housing or the lid includes a wall configured to interface with terminals of the lithium-ion electrochemical cell. Each lithium-ion electrochemical cell also includes a first terminal having a bolt extending through an opening in the wall such that the bolt passes through the opening at a location along a longitudinal axis of the first terminal, a first gasket disposed radially between the bolt and the wall proximate the location to electrically insulate the bolt from the wall, a second gasket positioned axially adjacent to the first gasket and disposed radially between the bolt and the wall to electrically insulate the bolt from the wall, and a press ring disposed exterior to the casing. The press ring is axially adjacent to the second gasket such that the second gasket is disposed axially between the first gasket and the press ring, and the press ring is radially between the second gasket and the bolt.

In accordance with a third embodiment, a battery module includes a first electrochemical cell, a second electrochemical cell, and a third electrochemical cell. Each of the first, second, and third electrochemical cells includes a cell element, a casing configured to receive the cell element (where the casing includes a wall having a first terminal opening), and a first terminal in electrical communication with a first electrode of the cell element and configured to interface with the first terminal opening. Each of the first, second, and third electrochemical cells also includes a terminal post of the first terminal extending through the first terminal opening along a longitudinal axis of the terminal post, a first insulating gasket of the first terminal extending into an interior of the casing and disposed radially between the terminal post and the wall of the casing with respect to the longitudinal axis, a second insulating gasket of the first terminal extending exterior to the casing, positioned axially adjacent to the first insulating gasket with respect to the longitudinal axis, and disposed radially between the terminal post and the wall of the casing with respect to the longitudinal axis, a press ring of the first terminal disposed exterior to the casing and radially between the second insulating gasket and the terminal post with respect to the longitudinal axis, and a second terminal in electrical communication with a second electrode of the cell element. The battery module also includes a first bus bar coupling the first terminal of the first electrochemical cell with the second terminal of the second electrochemical cell, and a second bus bar coupling the second terminal of the first electrochemical cell with the first terminal of the third electrochemical cell.

DRAWINGS

Various aspects of this disclosure may be better understood upon reading the following detailed description and upon reference to the drawings in which.

DETAILED DESCRIPTION

Figure 1:
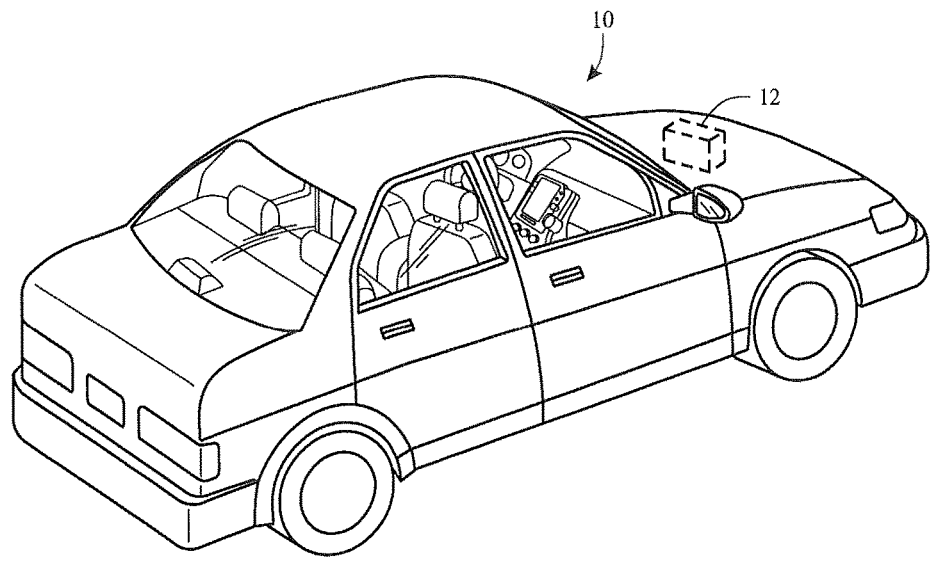
FIG. 1 is perspective view of an embodiment of a vehicle having a battery system contributing all or a portion of the motive power for the vehicle, in accordance with an aspect of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a housing and a number of battery cells (e.g., lithium-ion (Li-ion) electrochemical cells) arranged within the housing to provide particular voltages and/or currents useful to power, for example, one or more components of an xEV. As another example, battery modules in accordance with present embodiments may be incorporated with or provide power to stationary power systems (e.g., non-automotive systems).

Present embodiments are generally directed toward terminals of an electrochemical cell (e.g., first and second terminals of the electrochemical cell, positive and negative terminals of the electrochemical cell). For example, the electrochemical cell may include a housing (e.g., prismatic housing) configured to receive a cell element. The housing may include an opening (e.g., open end) in a top side or in a bottom side (e.g., opposite to the top side) of the housing. The electrochemical cell may also include a lid that couples with the housing over the opening (e.g., the open end) in the top side or in the bottom side of the housing to seal the cell element within the housing. The housing and the lid together may be referred to as a casing. The top side or the bottom side of the casing may include a wall (e.g., a casing wall or a lid wall), and the terminals of the electrochemical cell may extend through and/or interface with the wall of the casing.

A first terminal of the electrochemical cell may include a terminal post that extends through a terminal hole in the wall of the casing. The first terminal may also include a first gasket (e.g., bottom gasket) disposed between the terminal post and the wall of the casing. For example, the first gasket (e.g., the bottom gasket) extends into an interior of the housing and insulates the terminal post from the wall of the casing. The first terminal may also include a second gasket (e.g., top gasket) disposed between the terminal post and the wall of the casing. The second gasket (e.g., the top gasket) insulates the terminal post from the wall of the casing. The first gasket and the second gasket may include similar or the same geometric shape and size, and may be interchangeable (although, in some embodiments, oriented differently).

Further, the terminal post and the second gasket (e.g., the top gasket) may define an annular crevice (e.g., radial crevice) extending along the terminal post on an exterior of the electrochemical cell (e.g., the annular crevice extends annularly between the terminal post and the second gasket [e.g., the top gasket]). A press ring may be disposed in the annular crevice to enable improved sealing of the terminal hole opening. For example, the press ring may include a central opening through which the terminal post extends, and the press ring may be sized to press into the terminal post (or into a component disposed between the press ring and the terminal post, as described below) to enable an interference fit between the rings, the terminal posts, and the gaskets. The second gasket (e.g., the top gasket) may press into (or hug) an outer annular surface of the press ring to further improve the seal of the terminal opening. In some embodiments, the press ring may include a top disposed over a top surface of the terminal post, and may be referred to as a press ring cap.

In still other embodiments, a terminal cap may be disposed between the press ring and the terminal post. For example, the terminal cap may be disposed over the terminal post and may extend from the interior of the housing, through the terminal hole opening, and over a top surface of the terminal post. In general, the terminal post corresponding with the first terminal may include a first material that is different than a second base material of the terminal cap. For example, the terminal post may include copper as the first material, and the terminal cap may include aluminum as the second base material. Accordingly, an aluminum bus bar may be welded to an outer surface of the terminal cap to enable an electrical path from the terminal post, through the terminal cap, through the bus bar, and to another terminal (e.g., aluminum terminal) of an adjacent electrochemical cell. The aluminum-to-aluminum weld may be desirable over an aluminum-to-copper or a copper-to-copper weld. The terminal cap may be nickel plated along an inner surface of the terminal cap to facilitate improved physical contact between the terminal cap with the terminal post, and to enable the welding of the aluminum base material of the terminal cap with the aluminum of the bus bar. In some embodiments, the terminal post (e.g., copper terminal post) may be metal plated (e.g., nickel plated), in addition to or in the alternate of the terminal cap, to facilitate the physical contact between the terminal cap and the terminal post In general, the second terminal may be a tab, a ridge, or a pad (e.g., aluminum tab, ridge, or pad) that is mounted to the wall of the casing of the electrochemical cell. For example, the casing of the electrochemical cell may include an electrically conductive material (e.g., a metallic material). The cell element may include an electrode in electrical communication with the casing, causing the casing to be electrically charged. Accordingly, the pad of the second terminal, when mounted to the wall of the housing or to the lid of the electrochemical cell, may be electrically charged. If the pad is aluminum, an aluminum bus bar may extend from the pad and to a terminal of the adjacent electrochemical cell.

By utilizing terminals in accordance with the descriptions above, material costs may be reduced, improved coupling of terminals having dissimilar materials may be enabled, an improved seal of the terminal hole opening in the housing may be enabled, and assembly of the electrochemical cell may be simplified. With the foregoing in mind, the present embodiments relating to a thermal epoxy adhesive may be applied to any battery or battery system, in particular battery systems employed in an xEV (e.g., an mHEV). For example, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

As previously described, the battery system 12 may include a battery module having electrochemical cells, where each electrochemical cell includes terminals interfacing with a housing of the electrochemical cell. The terminals, in accordance with the present disclosure, may enable reduced material costs, may improve coupling of terminals having dissimilar materials, may improve a seal of the terminal hole opening in the housing, and may simplify assembly of the electrochemical cell. The terminals will be described in detail below with reference to later figures.

Figure 2:
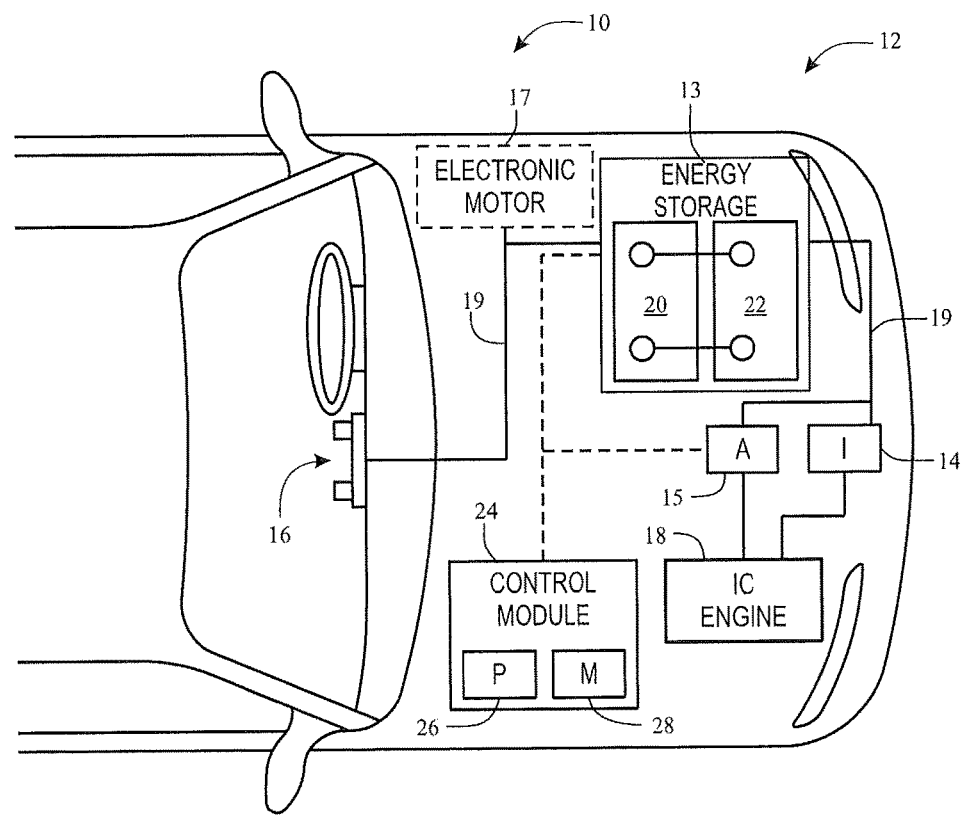
FIG. 2 illustrates a cutaway schematic representation of an embodiment of the vehicle of FIG. 1 provided in the form of a hybrid electric vehicle in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, resistors, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. In other embodiments, regenerative braking energy may be captured by a separate regenerative braking system from the alternator 15 and/or the electric motor 17.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium-ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules.

Additionally, although the lithium-ion battery module 20 and lead-acid battery module 22 are depicted adjacent to one another, they may be positioned in different areas around the vehicle. For example, the lead-acid battery module 22 may be positioned in or about the interior of the vehicle 10 while the lithium-ion battery module 20 may be positioned under the hood of the vehicle 10.

In some embodiments, the energy storage component 13 may include multiple battery modules to utilize multiple different battery chemistries. For example, when the lithium-ion battery module 20 is used, performance of the battery system 12 may be improved since the lithium-ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Although not depicted in the illustrated embodiment, the battery module 20 may include a number of electrochemical cells disposed therein, where each electrochemical cell includes one or more terminals. The terminals, in accordance with the present disclosure, may enable reduced material costs, may improve coupling of terminals having dissimilar materials, may improve a seal of the terminal hole opening in the housing, and may simplify assembly of the electrochemical cell. The terminals will be described in detail below with reference to later figures.

Figure 3:
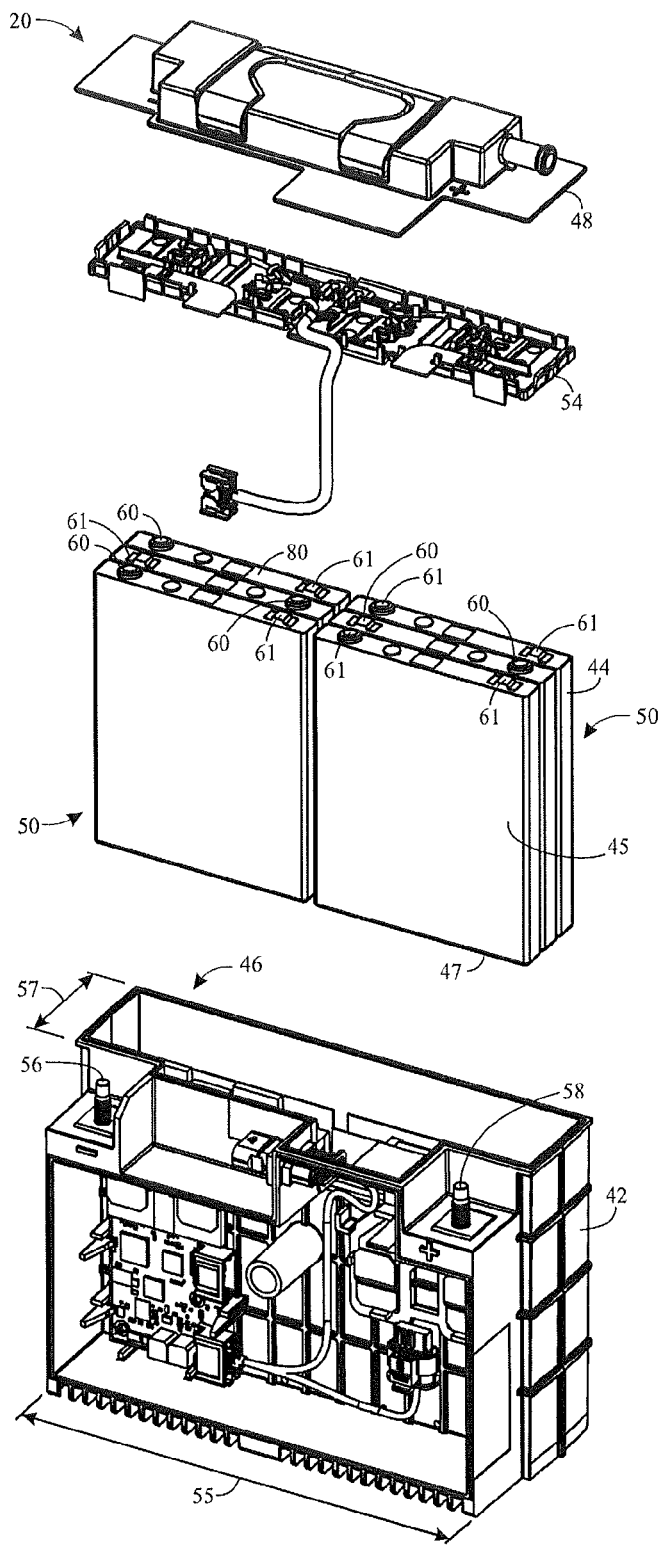
FIG. 3 is a perspective view of an embodiment of a battery module for use in the vehicle of FIG. 1, in accordance with an aspect of the present disclosure.

For example, FIG. 3 is a perspective view of an embodiment of the battery module 20. The battery module 20 illustrated in FIG. 3 includes a housing 42 that may be metallic (e.g., made from steel, aluminum, or another suitable metal) or may be polymeric (e.g., polypropylene, acrylonitrile butadiene styrene (ABS), a polystyrene (PS), a polyimide (PI), or another suitable polymer or plastic or combination thereof).

The housing 42 of the battery module 20 holds one or more electrochemical cells 44 (e.g., lithium-ion cells, nickel metal hydride cells, lithium polymer cells, or any other suitable electrochemical cell) of the battery module 20. Each electrochemical cell 44 includes an individual housing 45 and an individual lid 47, where the lid 47 is disposed on a bottom of the housing 45. In other embodiments, the lid 47 may be disposed on a top of the housing 45. The housing 45 and the lid 47 may together form a casing of the electrochemical cell 44, where the casing encloses a cell element.

The electrochemical cells 44 are disposed in the housing 42 of the battery module 20 through a housing opening 46. When the battery module 20 is fully assembled, a cover 48 is sealed over the housing opening 46 to completely enclose the electrochemical cells 44. The cover 48 may be manufactured from metallic or polymeric materials (e.g., polypropylene), similar to (or different than) the material of the housing 42. The cover 48 and the housing 42 together form a casing which receives and encloses the electrochemical cells 44 therein.

Depending on the voltage and/or capacity requirements, as well as the individual voltage and coupling of each cell, the battery module 20 may include any number of the electrochemical cells 44, for example, between one and forty (e.g., six, eight, ten, twelve, twenty, or more electrochemical cells 44). The electrochemical cells 44 may be inserted into the housing 42 as cell stacks 50 (e.g., in the illustrated embodiment, the battery module 20 includes two cell stacks 50 of three electrochemical cells 44 each). In other embodiments, each electrochemical cell 44 may be individually indexed in trays, cell slots, or a similar structure disposed in the housing 42. Further, the housing 42 may include additional structures, such as spacers, to separate the electrochemical cells 44 or the cell stacks 50 from other electrochemical cells 44 or cell stacks 50.

A bus bar carrier 54 may be used to hold the electrochemical cells 44 in place within the housing 42. The bus bar carrier 54 may include features (e.g., electrical connectors, such as bus bars) that interface with the electrochemical cells 44 in the battery module 20. The illustrated arrangement of the electrochemical cells 44 (e.g., in the two cell stacks 50) may enable standardized dimensions (e.g., length 55 and width 57) for the housing 42.

The electrochemical cells 44, as a group, may provide power to the electric vehicle (e.g., xEV 10) through a pair of terminals 56 and 58 that connect the battery module 20 to an electrical load (e.g., circuit). For example, in the illustrated embodiments, the electrochemical cells 44 each have a positive electrode (e.g., a cathode) and a negative electrode (e.g., an anode) enclosed within a casing (e.g., packaging) of the respective electrochemical cell. The positive and negative electrodes each have terminals 60, 61 extending through (or otherwise interfacing with) a wall 80 of the casing of the electrochemical cell 44. The wall 80 of the casing in the illustrated embodiment is a wall of the housing 45 of the electrochemical cell 44. However, in embodiments where the lid 47 is disposed at a top of the housing 45, the wall 80 of the casing may be a wall of the lid 47. As described in detail below with reference to later figures, and in accordance with embodiments of the present disclosure, the terminals 60, 61 may enable reduced material costs, may improve coupling of terminals having dissimilar materials, may improve a seal of the terminal hole opening in the housing, and may simplify assembly of the electrochemical cell.

Figure 4:
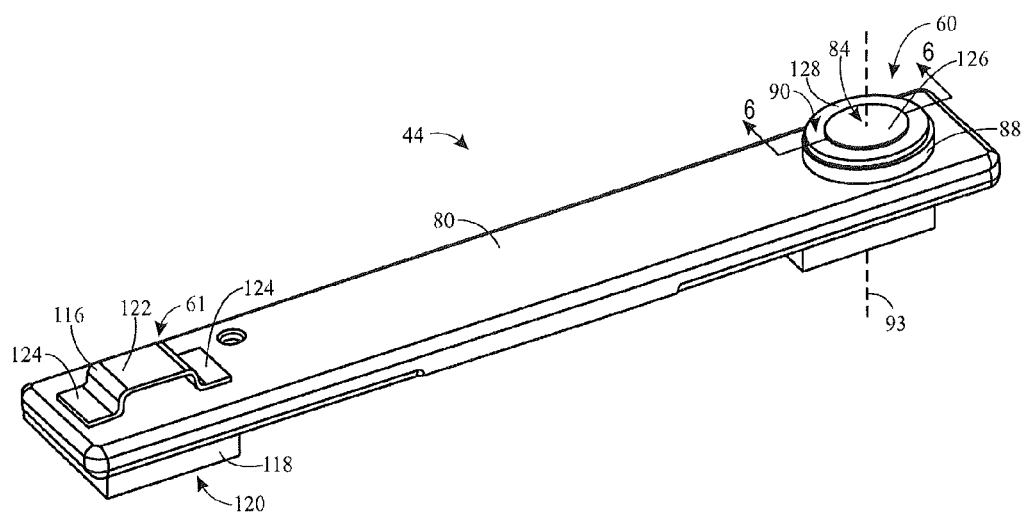
FIG. 4 is a perspective view of an embodiment of terminals of an electrochemical cell extending through a housing or a lid of the electrochemical cell, in accordance with an aspect of the present disclosure.
Figure 5:
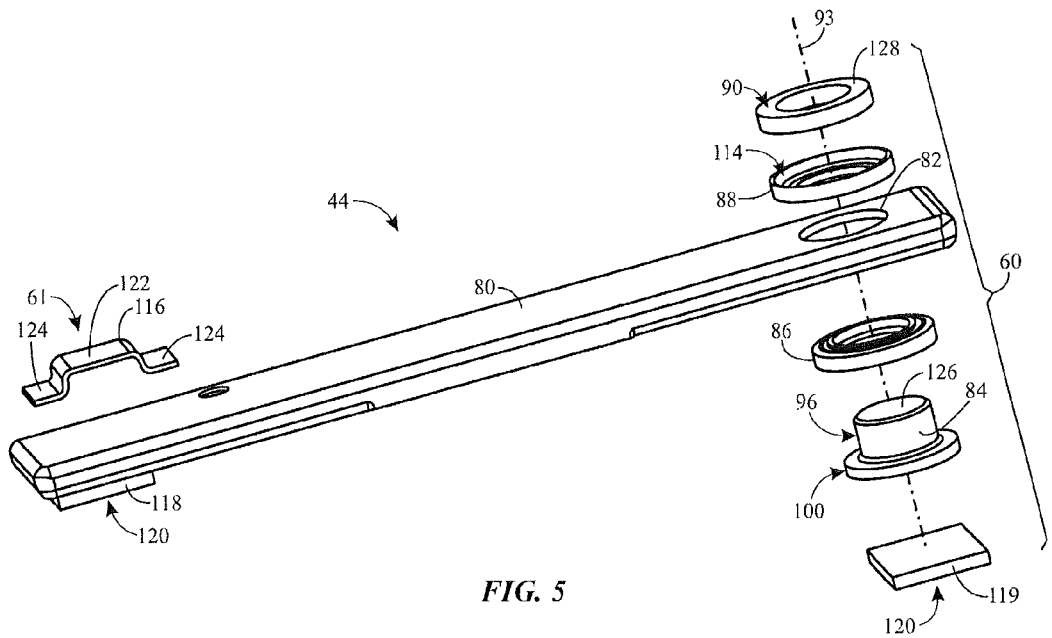
FIG. 5 is an exploded perspective view of an embodiment the terminals and the housing or the lid of FIG. 4, in accordance with an aspect of the present disclosure.
Figure 6:
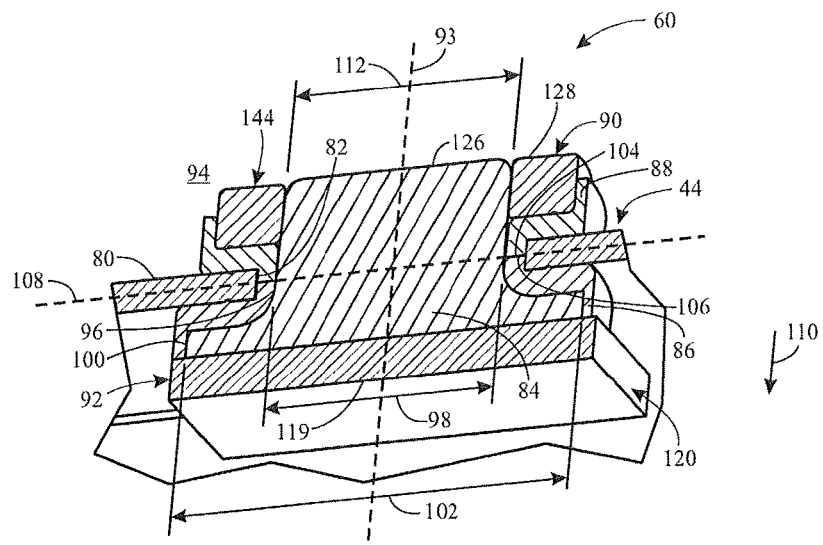
FIG. 6 is a cross sectional view of one of the terminals and the housing or the lid of FIG. 4, taken along lines 6-6 in FIG. 4, in accordance with an aspect of the present disclosure.

FIGS. 4-6 illustrate an embodiment of the terminals 60, 61 of one of the electrochemical cells 44 illustrated in FIG. 3. For example, FIG. 4 is a perspective view of an embodiment of the first terminal 60, the second terminal 61, and the wall 80 of the casing of the electrochemical cell 44, FIG. 5 is an exploded perspective view the terminals 60, 61 and the wall 80 of FIG. 4, and FIG. 6 is a cross sectional view of one of the terminals 60, 61 and the wall 80 of FIG. 4, taken along lines 6-6 in FIG. 4. It should be noted that the wall 80 may be a wall of a housing of the electrochemical cell 44 or of a lid of the electrochemical cell 44.

In general, the terminals 60, 61 may interface with the wall 80 of the electrochemical cell 44. For example, focusing in particular on FIGS. 5 and 6, the first terminal 60 may include components that extend through a terminal hole opening 82 in the wall 80. The first terminal 60 may include a terminal post 84, a first insulating gasket 86 (e.g., lower insulating gasket), a second insulating gasket 88 (e.g., upper insulating gasket), and a press ring 90. The terminal post 84, the first insulating gasket 86, the second insulating gasket 88, and the press ring 90 may be aligned with (e.g., centered about) a longitudinal axis 93 of the first terminal 60 (or of the terminal post 84).

As illustrated in FIG. 6, the terminal post 84 may extend from an interior 92 of the electrochemical cell 44, through the terminal hole opening 82 in the wall 80 of the casing of the electrochemical cell 44, and into a space 94 exterior to the casing of the electrochemical cell 44. The terminal post 84 may include an upper cylindrical portion 96 having a first diameter 98 and a lower cylindrical portion 100 having a second diameter 102 larger than the first diameter 98. The lower cylindrical portion 100 may be considered a flanged portion that extends from the upper cylindrical portion 96 radially outward with respect to the longitudinal axis 93.

The first insulating gasket 86 may be shaped to accommodate both the lower cylindrical portion 100 and the upper cylindrical portion 96 of the terminal post 84. In general, the first insulating gasket 86 may be shaped, sized, and positioned (e.g. radially between the terminal post 84 and the wall 80, with respect to the longitudinal axis 93) to electrically insulate the terminal post 84 from the wall 80 of the casing of the electrochemical cell 44. Accordingly, the first insulating gasket 86 may include an electrically insulative (and/or a compliant) material, such as semi-crystalline materials like polyphenylene sulfide (PPS). Further, a cavity defined by the first insulating gasket 86 has a stepped cross-section to accommodate the upper and lower cylindrical portions 96, 100, as illustrated in FIG. 6. The dimensions of these features with respect to the edges of the opening 82 may facilitate a press fit with the wall 80. For example, engaging the terminal post 84 and the first insulating gasket 86 may press the gasket 86 into the wall 80 along the edges of the opening 82.

The second insulating gasket 88 (e.g., upper insulating gasket) may be disposed axially adjacent to the first insulating gasket 86 (e.g., lower insulating gasket). The second insulating gasket 88 may be shaped to accommodate the upper cylindrical portion 96 of the terminal post 84, and to accommodate the press ring 90. In general, the second insulating gasket 88 is shaped, sized, and positioned (e.g., radially between the terminal post 84 and the wall 80, with respect to the longitudinal axis 93) to electrically insulate the terminal post 84 from the wall 80 of the casing of the electrochemical cell 44. Accordingly, the second insulating gasket 88 may include an electrically insulative (and/or a compliant) material, such as semi-crystalline materials like polyphenylene sulfide (PPS). As shown in FIG. 6, the first and second insulating gaskets 86, 88 may be interchangeable (e.g., similar or the same in shape and size), with identical top surfaces 104, 106 of the first and second gaskets 86, 88, respectively, facing each other. In other words, the first and second insulating gaskets 86, 88 may include the same physical features, but may be oriented differently from one another. For example, the first and second insulating gaskets 86, 88 in FIG. 6 each form mirrored S-shaped cross-sectional profiles with respect to a wall axis 107 of the wall 80 of the electrochemical cell 44. By utilizing interchangeable first and second insulating gaskets 86, 88, a number of part types may be reduced, and manufacturing and assembly of the electrochemical cell 44 is simplified. Further, each gasket 86, 88 may facilitate the press fit with the opening 82 described above. In some embodiments, gaskets 86, 88 may not be necessary to enable interference fits with between the terminal post 84 and the cover 48.

As previously described, the press ring 90 is disposed radially between the second insulating gasket 88 and the terminal post 84 (e.g., the upper cylindrical portion 96 of the terminal post 84). As shown in FIG. 6, the press ring 90 may be pressed downwardly (e.g., in direction 110) and/or radially inwardly (e.g., toward the longitudinal axis 93). Thus, the press ring 90 may force the insulating gasket 88 toward the wall 80. Further, the lower cylindrical portion 100 of the terminal post 84 may be pressed upwardly (e.g., opposite to direction 110), such that the lower cylindrical portion 100 of the terminal post 84 forces the insulating gasket 86 toward the wall 80. In other words, the press ring 90 and the lower cylindrical portion 100 of the terminal post 84 may clamp the gasket 86, the wall 80, and the gasket 88 to generate a seal. In some embodiments, a diameter 112 of the press ring 90 may be increased prior to or during positioning of the press ring 90 in the first terminal 60. As the press ring 90 is pressed into place in accordance with the description above, the diameter 112 of the press ring 90 may be reduced to cause the press ring 90 to cling to, or press into, the terminal post 84, thereby fixing the press ring 90 in place. The diameter 112 of the press ring 90 may be manipulated by heating and cooling the press ring 90, by crimping the press ring 90, or by some other means. In some embodiments, the diameter 112 of the press ring 90 may not be manipulated, and the press ring 90 may merely be pressed into place (e.g., within a crevice 114 defined between the second insulating gasket 88 and the terminal post 84). In general, the press ring 90 may enhance a seal of the terminal hole opening 82. To facilitate the improved seal, the press ring 90 may be made of a material such as stainless steel.

In addition to the first terminal 60, the electrochemical cell 44 includes the second terminal 61 illustrated in FIGS. 4 and 5. As shown, the second terminal 61 includes a tab 116 mounted to the wall 80 of the electrochemical cell 44. In other words, the tab 116 may be electrically connected with the wall 80, and the wall 80 may be electrically connected with a first electrode (e.g., represented by reference numeral 118) of a cell element (e.g., represented by reference numeral 120) of the electrochemical cell 44. Because the wall 80 may be charged by way of its electrical contact with the first electrode 118 of the cell element 120, the first terminal 60 may be electrically insulated from the wall 80 (e.g., via the insulating gaskets 86, 88), and in direct electrical contact with a second electrode 119 of the cell element 120. In some embodiments, the direct electrical contact may be provided via a current collector or some other intervening component between the second electrode 119 and the terminal post 84. Further, a current collector or some other intervening component may provide electrical communication between the wall 80 and the first electrode 118 of the cell element 120.

Continuing with the second terminal 61, the tab 116 may include a raised portion 122 and two flanges 124. The flanges 124 may be mounted to the wall 80 via welding, fasteners, or some other coupling means. The raised portion 122 may be configured to receive a bus bar (e.g., where the bus bar is welded, fastened, or otherwise coupled with the raised portion 122).

In general, the first terminal 60 of a first electrochemical cell is configured to be coupled (e.g., via a bus bar) with the second terminal 61 of a second electrochemical cell (e.g., adjacent to the first electrochemical cell). Further, the second terminal 61 of the first electrochemical cell is configured to be coupled (e.g., via a bus bar) with the first terminal 60 of a third electrochemical cell (e.g., adjacent to the first electrochemical cell). Bus bars may extend from the ridge 122 of the tab 116 of the second terminal 61 (e.g., of one electrochemical cell) to a top surface 126 of the terminal post 84 of the first terminal 60 (e.g., of a different, adjacent electrochemical cell). For example, the top surface 126 of the terminal post 84 may be flush with, or extend slightly above, a top surface 128 of the press ring 90. Accordingly, the bus bar may access the top surface 126 of the terminal post 84, and may be coupled (e.g., welded) thereto. In general, the terminal post 84 may be a copper material, and the tab 116 may be an aluminum material. Aluminum or bi-metal bus bars may be used to couple terminals of adjacent electrochemical cells.

Figure 7:
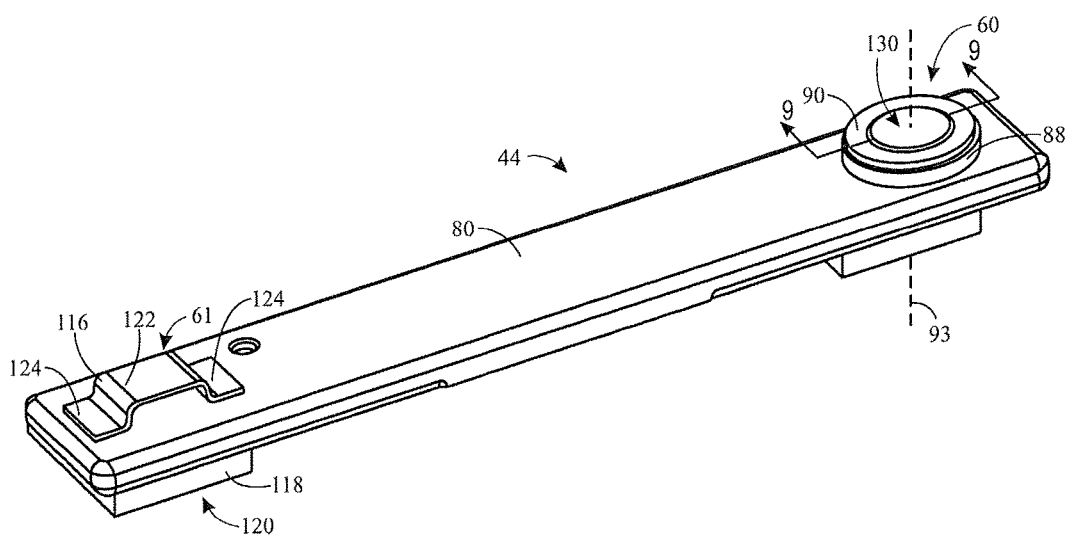
FIG. 7 is a perspective view of an embodiment of terminals of an electrochemical cell extending through a housing or a lid of the electrochemical cell, in accordance with an aspect of the present disclosure.
Figure 8:
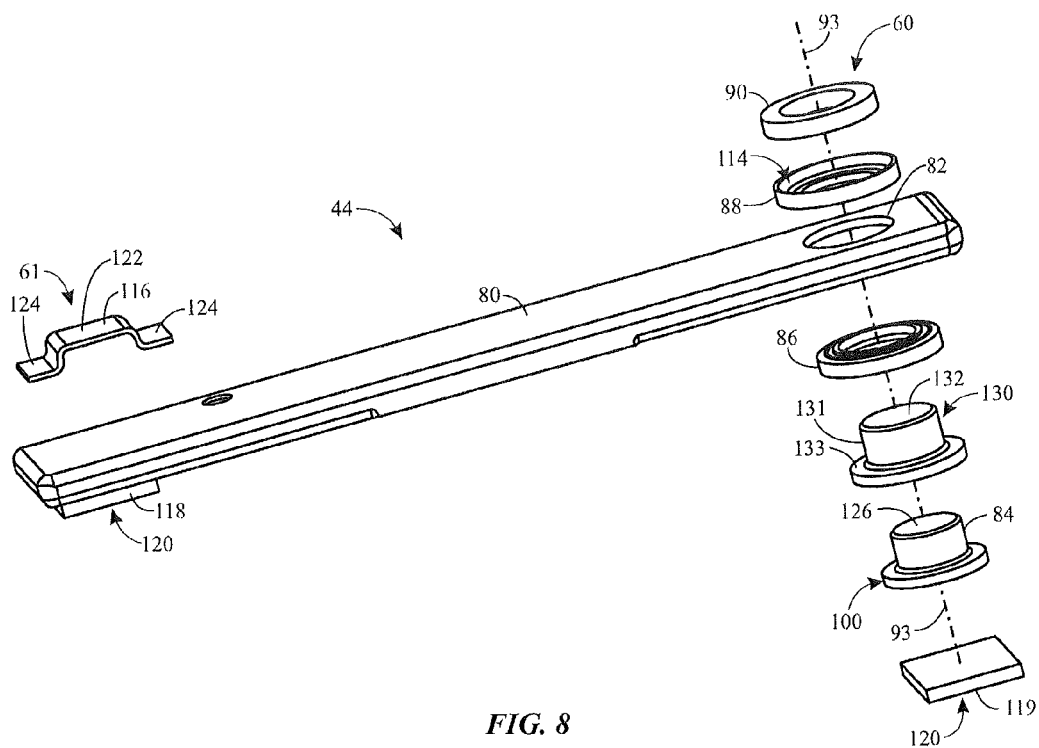
FIG. 8 is an exploded perspective view of an embodiment the terminals and the housing or the lid of FIG. 7, in accordance with an aspect of the present disclosure.
Figure 9:
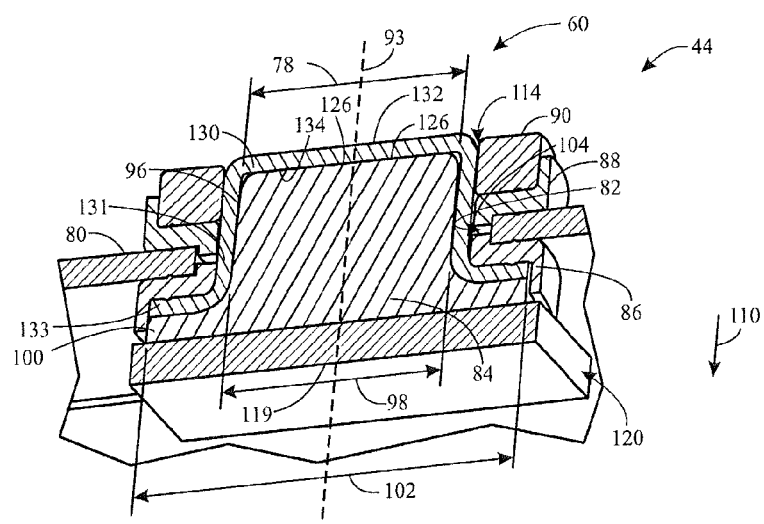
FIG. 9 is a cross sectional view of one of the terminals and the housing or the lid of FIG. 7, taken along lines 9-9 in FIG. 7, in accordance with an aspect of the present disclosure.

FIGS. 7-9 illustrate an embodiment of the terminals 60, 61 of one of the electrochemical cells 44 of FIG. 3. For example, FIG. 7 is a perspective view of an embodiment of the first terminal 60, the second terminal 61, and the wall 80 of the electrochemical cell 44, FIG. 8 is an exploded perspective view of an embodiment of the terminals 60, 61 and the wall 80 of FIG. 7, and FIG. 9 is a cross sectional view of one of the terminals 60 and the wall 80 of FIG. 7, taken along lines 9-9 in FIG. 7. It should be noted, as previously described, that the wall 80 may be a wall of a housing of the electrochemical cell 44 or of a lid of the electrochemical cell 44.

In the illustrated embodiments, focusing particularly on FIGS. 8 and 9, the first terminal 60 includes the terminal post 84, the first insulating gasket 86, the second insulating gasket 88, and the press ring 90. The first terminal 60 also includes a terminal cap 130 disposed over the terminal post 84. For example, the terminal cap 130 is disposed over the terminal post 84 such that a top surface 132 of the terminal cap 130 extends over the top surface 126 of the terminal post 84. The terminal cap 130 also includes a midsection 131 that extends proximate to the upper cylindrical portion 96 of the terminal post 84, and a flange 133 that extends proximate to the lower cylindrical portion 100 of the terminal post 84. The terminal cap 130 may include an aluminum base, while the terminal post 84 includes a copper base. The terminal cap 130 may be metal plated (e.g., nickel plated) on an inner surface 134 of the terminal cap 130 (shown in FIG. 9), which facilitates improved contact between the terminal cap 130 and the terminal post 84 and avoid galvanic corrosion between aluminum and copper. In some embodiments, the terminal post 84 may be metal plated (e.g., nickel plated) in addition to, or the alternative of, the terminal cap 130. In this embodiment, the terminal cap 130 and the terminal post 84 coordinate to function like the terminal post 84 in previously described embodiments while adding functionality.

Further, an aluminum bus bar coupling the first terminal 60 with an adjacent terminal of an adjacent electrochemical cell may more readily couple with the aluminum material of the terminal cap 130 (e.g., compared with a copper material of the terminal post 84). As previously described, the tab 116 of the second terminal 61 may also include an aluminum material. Accordingly, an aluminum bus bar may extend between the aluminum terminal cap 130 of the first terminal 60 of a first electrochemical cell, to the aluminum tab 116 of the second terminal 61 of a second electrochemical cell. It should be noted that, in comparison with the embodiments of the first terminal 60 shown in FIGS. 4-6, the embodiments of the first terminal 60 shown in FIGS. 7-9 may include either (a) smaller diameters 98, 102 of the terminal post 84; or (b) a larger terminal hole opening 82 and larger diameters of the first and second insulating gaskets 86, 88, thereby accommodating a thickness of the aluminum cap 130 (e.g., disposed radially between the terminal post 84 and the insulating gaskets 86, 88, with respect to the longitudinal axis 93). As previously described, the insulating gaskets 86, 88 may include an electrically insulative and/or a compliant material (e.g., a semi-crystalline material, such as PPS).

Focusing in particular on FIG. 9, the press ring 90 may be pressed downwardly (e.g., in direction 110) and/or radially inwardly (e.g., toward the longitudinal axis 93). Thus, the press ring 90 may force the upper insulating gasket 88 toward the wall 80. Further, the lower cylindrical portion 100 of the terminal post 84 may be pressed upwardly (e.g., opposite to direction 110), such that the lower cylindrical portion 100 of the terminal post 84 forces the lower insulating gasket 86 toward the wall 80. In other words, the press ring 90 and the lower cylindrical portion 100 of the terminal post 84 may clamp the lower gasket 86, the wall 80, and the upper gasket 88 to generate a seal.

Figure 10:
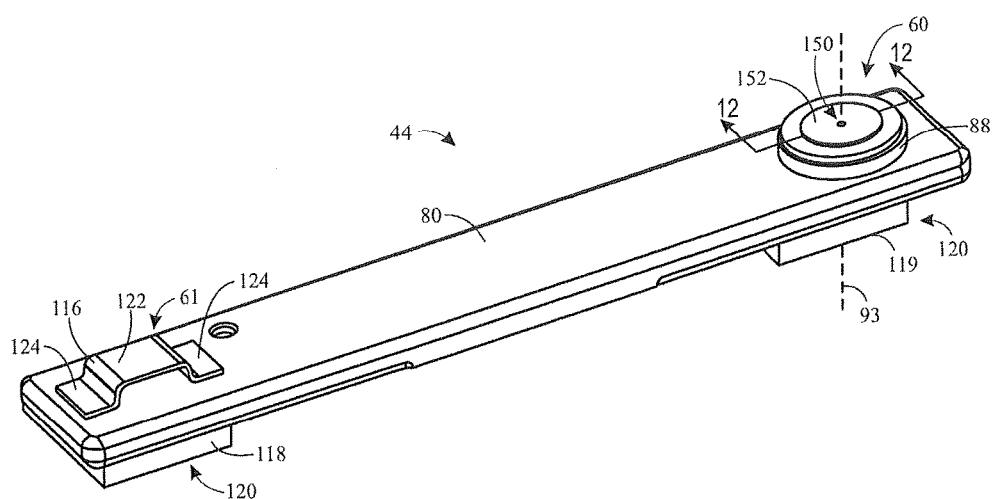
FIG. 10 is a perspective view of an embodiment of terminals of an electrochemical cell extending through a housing or a lid of the electrochemical cell, in accordance with an aspect of the present disclosure.
Figure 11:
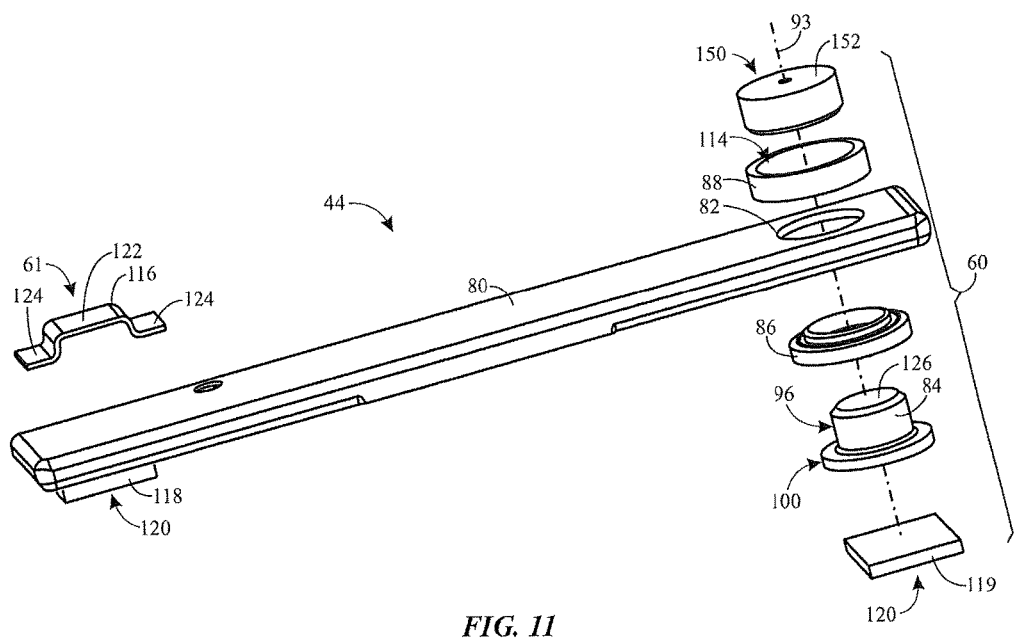
FIG. 11 is an exploded perspective view of an embodiment the terminals and the housing or the lid of FIG. 10, in accordance with an aspect of the present disclosure.
Figure 12:
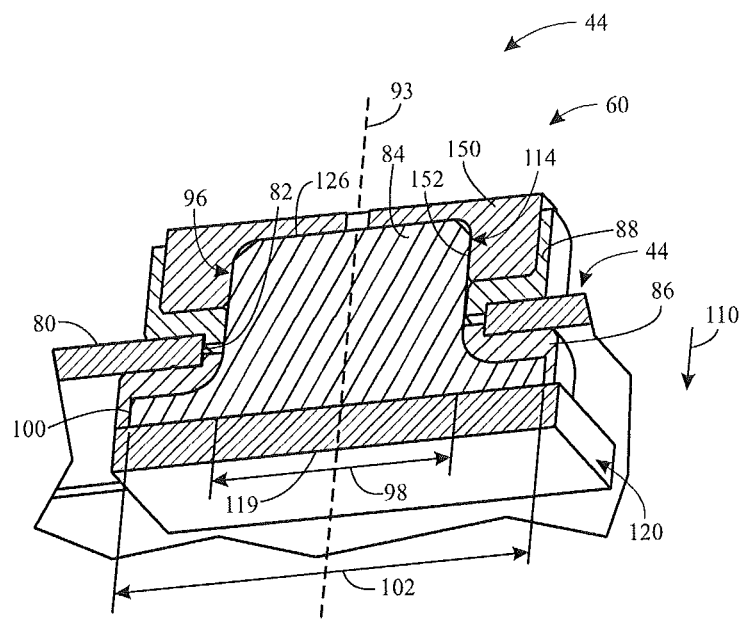
FIG. 12 is a cross sectional view of one of the terminals and the housing or the lid of FIG. 10, taken along lines 12-12 in FIG. 10, in accordance with an aspect of the present disclosure.

FIGS. 10-12 illustrate an embodiment of the terminals 60, 61 of one of the electrochemical cells 44 of FIG. 3. For example, FIG. 10 is a perspective view of an embodiment of the first terminal 60, the second terminal 61, and the wall 80 of the electrochemical cell 44, FIG. 11 is an exploded perspective view of an embodiment the terminals 60, 61 and the wall 80 of FIG. 10, and FIG. 12 is a cross sectional view of the terminal 60 and the wall 80 of FIG. 10, taken along lines 12-12 in FIG. 10.

In the illustrated embodiments, focusing in particular on FIGS. 11 and 12, the first terminal 60 includes the terminal post 84, the first insulating gasket 86, the second insulating gasket 88, and a capped press ring 150. The press ring cap 150 is similar to the press ring 90 illustrated in FIGS. 4-9, in that the press ring cap 150 fits within the crevice 114 between the second insulating gasket 88 and the terminal post 84. However, the press ring cap 150 also extends over the top surface 126 of the terminal post 84, unlike the press ring 90 illustrated in FIGS. 4-9. Accordingly, the press ring cap 150 may be considered a different type of press ring than the press ring 90 illustrated in FIGS. 4-9. In general, the press ring cap 150 may be axially loaded and press fit onto the terminal post 84. The press ring cap 150 may include an aluminum material, to facilitate welding of an aluminum bus bar thereto (e.g., as opposed to attempting to weld the aluminum bus bar to the copper material of the terminal post 84). In some embodiments, the press ring cap 150 may be metal plated (e.g., nickel plated) on an inner surface 152 of the press ring cap 150, thereby facilitating improved contact between the press ring cap 150 and the terminal post 84 and avoid galvanic corrosion.

It should also be noted that, in the embodiments illustrated in FIGS. 10-12, the first insulating gasket 86 and the second insulating gasket 88 may be shaped differently from one another, such that the second insulating gasket 88 accommodates positioning of the press ring cap 150 within the crevice 114 radially between the press ring cap 150 and the second insulating gasket 88. Additionally, the terminal post 84 may include smaller diameters 98, 102 than those illustrated in FIGS. 4-6, for example, and the terminal hole opening 82 may be smaller than the opening illustrated in FIGS. 4-6.

Focusing in particular on FIG. 12, the press ring cap 150 may be pressed downwardly (e.g., in direction 110) and/or radially inwardly (e.g., toward the longitudinal axis 93). Thus, the press ring cap 150 may force the upper insulating gasket 88 toward the wall 80. Further, the lower cylindrical portion 100 of the terminal post 84 may be pressed upwardly (e.g., opposite to direction 110), such that the lower cylindrical portion 100 of the terminal post 84 forces the lower insulating gasket 86 toward the wall 80. In other words, the press ring cap 150 and the lower cylindrical portion 100 of the terminal post 84 may clamp the lower gasket 86, the wall 80, and the upper gasket 88 to generate a seal.

Figure 13:
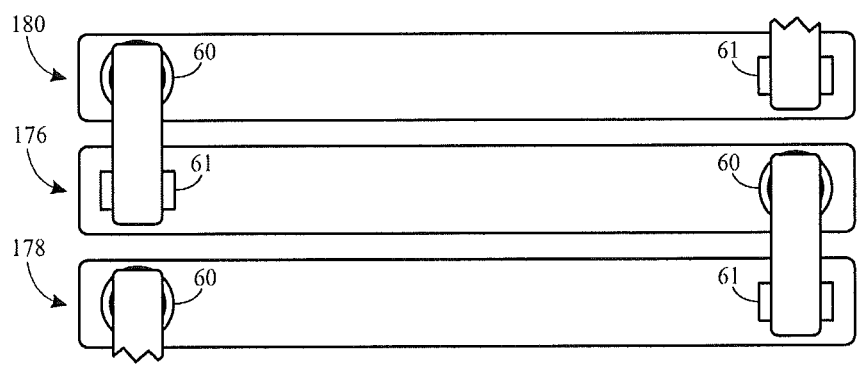
FIG. 13 is a top schematic view of an embodiment of electrochemical cells of a battery module, in accordance with an aspect of the present disclosure.

FIG. 13 is a top schematic view of an embodiment of three of the electrochemical cells of FIG. 3, each having the first terminal 60 and the second terminal 61. As shown, a first bus bar 170 enables electrical coupling between the first terminal 60 of a first cell 176 and the second terminal 61 of a second cell 178. For example, the first bus bar 170 may be welded to the first terminal 60 of the first cell 176 and to the second terminal 61 of the second cell 178. Further, a second bus bar 172 enables electrical coupling between the second terminal 61 of the first cell 176 and the first terminal 60 of a third cell 180. For example, the second bus bar 172 may be welded to the second terminal 61 of the first cell 176 and the first terminal 60 of the third cell 180. Any number of bus bars and electrochemical cells may be utilized in accordance with the present disclosure.

As set forth above, one or more of the disclosed embodiments, alone or in combination, may provide one or more technical effects useful in the manufacture of electrochemical cells. For example, the disclosed terminals or terminals, compared to traditional configurations, may reduce a material cost of the electrochemical cell, may reduce a weight of the electrochemical cell, may facilitate improved sealing of a terminal hole opening of the electrochemical cell, may facilitate improved electrical communication between electrochemical cells of a battery module, and may simplify manufacturing and assembly of the battery module and/or corresponding electrochemical cells. The technical effects and technical problems in the specification are examples and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. An electrochemical cell, comprising;
   a cell element;
   a casing configured to receive the cell element, the casing comprising a wall having a first terminal opening;
   a first terminal in electrical communication with a first electrode of the cell element;
   a terminal post of the first terminal extending through the first terminal opening along a longitudinal axis of the terminal post, wherein the terminal post comprises a non-threaded engagement surface;
   a first gasket of the first terminal extending into an interior of the casing and disposed radially between the terminal post and the wall of the casing with respect to the longitudinal axis to electrically insulate the terminal post from the wall;
   a second gasket of the first terminal extending exterior to the casing, positioned axially adjacent to the first gasket with respect to the longitudinal axis, and disposed radially between the terminal post and the wall of the casing with respect to the longitudinal axis to electrically insulate the terminal post from the wall;
   a press ring of the first terminal disposed exterior to the casing and radially between the second gasket and the terminal post with respect to the longitudinal axis, wherein the press ring engages the non-threaded engagement surface of the terminal post via an interference fit; and a second terminal in electrical communication with a second electrode of the cell element.

2. The electrochemical cell of claim 1, wherein the electrochemical cell is a lithium-ion electrochemical cell.

3. The electrochemical cell of claim 1, wherein the casing comprises a housing configured to receive the cell element and a lid configured to enclose the cell element within the housing, wherein the wall of the casing comprises a housing wall or a lid wall.

4. The electrochemical cell of claim 1, wherein the casing is electrically conductive and facilitates the electrical communication between the second electrode of the cell element and the second terminal of the electrochemical cell.

5. The electrochemical cell of claim 4, wherein the second terminal comprises a tab mounted to the wall of the casing.

6. The electrochemical cell of claim 5, wherein the tab of the second terminal comprises a raised portion and at least one flange extending from the raised portion, wherein the at least one flange is configured to be welded to the wall of the casing and the raised portion is configured to contact a bus bar for coupling the second terminal with a terminal of an adjacent electrochemical cell.

7. The electrochemical cell of claim 1, wherein the press ring comprises a press ring cap having a first portion extending over the terminal post and having a second portion extending radially between the terminal post and the first gasket, wherein the second portion comprises the non-threaded engagement surface.

8. The electrochemical cell of claim 7, wherein the press ring cap comprises an aluminum base material.

9. The electrochemical cell of claim 8, wherein the press ring cap comprises a metal plating on an inner surface of the press ring cap, and wherein the metal plating comprises a material complimentary of a material of the terminal post.

10. The electrochemical cell of claim 9, wherein the material of the metal plating comprises nickel, and wherein the material of the terminal post comprises copper.

11. The electrochemical cell of claim 1, wherein the first gasket and the second gasket are interchangeable.

12. The electrochemical cell of claim 1, wherein the press ring is aluminum or stainless steel.

13. The electrochemical cell of claim 1, wherein the terminal post comprises copper.

14. A lithium-ion battery module comprising a plurality of lithium-ion electrochemical cells, each lithium-ion electrochemical cell comprising:

a housing configured to receive a cell element and a lid configured to enclose the cell element within the housing, wherein the housing or the lid comprises a wall configured to interface with terminals of the lithium-ion electrochemical cell; and a first terminal comprising a post extending through an opening in the wall such that the post passes through the opening at a location along a longitudinal axis of the first terminal, a first gasket disposed radially between the post and the wall proximate the location to electrically insulate the post from the wall, a second gasket positioned axially adjacent to the first gasket and disposed radially between the post and the wall to electrically insulate the post from the wall, and a press ring disposed exterior to the housing, the press ring being axially adjacent to the second gasket such that the second gasket is disposed axially between the first gasket and the press ring, and the press ring being radially between the second gasket and the post, wherein the press ring comprises a non-threaded interior radial surface along which the press ring engages the first terminal via an interference fit.

15. The lithium-ion battery module of claim 14, wherein each lithium-ion electrochemical cell comprises the cell element and a second terminal, wherein the cell element comprises a first electrode in electrical communication with the first terminal and a second electrode in electrical communication with the wall, and wherein the second terminal is in electrical communication with the wall.

16. The lithium-ion battery module of claim 15, comprising a plurality of bus bars, wherein each bus bar of the plurality of bus bars is configured to electrically connect the first terminal of a first lithium-ion electrochemical cell of the plurality of lithium-ion electrochemical cells with the second terminal of a second lithium-ion electrochemical cell of the plurality of lithium-ion electrochemical cells.

17. The lithium-ion battery module of claim 14, comprising an aluminum terminal cap disposed over the post and radially between the post and the first gasket, the second gasket, and the press ring, wherein the aluminum terminal cap comprises a non-threaded engagement surface along which the non-threaded interior radial surface of the press ring engages the first terminal via the interference fit.

18. The lithium-ion battery module of claim 17, wherein the aluminum terminal cap comprises an annular flange extending radially outward from the longitudinal axis within an interior of the housing.

19. The lithium-ion battery module of claim 17, wherein the aluminum terminal cap is nickel plated on an inner surface of the aluminum terminal cap, and wherein the post bolt is copper.

20. The lithium-ion battery module of claim 14, wherein the first gasket and the second gasket are substantially identical and interchangeable.

21. A battery module, comprising:

a first electrochemical cell, a second electrochemical cell, and a third electrochemical cell, wherein each of the first, second, and third electrochemical cells comprises:

a cell element;

a casing configured to receive the cell element, the casing comprising a wall having a first terminal opening;

a first terminal in electrical communication with a first electrode of the cell element;

a terminal post of the first terminal extending through the first terminal opening along a longitudinal axis of the terminal post;

a first insulating gasket of the first terminal extending into an interior of the casing and disposed radially between the terminal post and the wall of the casing with respect to the longitudinal axis;

a second insulating gasket of the first terminal extending exterior to the casing, positioned axially adjacent to the first insulating gasket with respect to the longitudinal axis and disposed radially between the terminal post and the wall of the casing with respect to the longitudinal axis;

a press ring of the first terminal disposed exterior to the casing and radially between the second insulating gasket and the terminal post with respect to the longitudinal axis, wherein the press ring comprises a non-threaded interior radial surface along which the press ring engages the first terminal via an interference fit; and a second terminal in electrical communication with a second electrode of the cell element;

a first bus bar coupling the first terminal of the first electrochemical cell with the second terminal of the second electrochemical cell; and a second bus bar coupling the second terminal of the first electrochemical cell with the first terminal of the third electrochemical cell.

22. The battery module of claim 21, wherein the first terminal of each of the first, second, and third electrochemical cells comprises a terminal cap disposed radially between the terminal post and the first insulating gasket, the second insulating gasket, and the press ring with respect to the longitudinal axis, wherein the first bus bar contacts the terminal cap of the first electrochemical cell, and wherein the second bus bar contacts the terminal cap of the second electrochemical cell.

23. The battery module of claim 22, wherein the terminal caps of the first terminals of the first, second, and third electrochemical cells comprise nickel plated aluminum.

24. The lithium ion battery of claim 14, wherein the first terminal comprises a non-threaded engagement surface along which the non-threaded interior radial surface of the press ring directly engages the first terminal via the interference fit.

25. The battery module of claim 21, wherein the first terminal comprises a non-threaded engagement surface along which the non-threaded interior radial surface of the press ring directly engages the first terminal via the interference fit.

* * * * *

UNITED STATES PATENT AND TRADEMARK OFFICE
CERTIFICATE OF CORRECTION

| | | |
|---|---|---|
| PATENT NO. | : 10,297,812 B2 | Page 1 of 1 |
| APPLICATION NO. | : 15/210635 | |
| DATED | : May 21, 2019 | |
| INVENTOR(S) | : Jonathan P. Lobert | |

It is certified that error appears in the above-identified patent and that said Letters Patent is hereby corrected as shown below:

In the Specification

In Column 3, Line 48, please delete "DRAWINGS" and insert -- BRIEF DESCRIPTION OF THE DRAWINGS --.

In Column 3, Line 53, please delete "is perspective" and insert -- is a perspective --.

In Column 4, Lines 1-2, please delete "embodiment the" and insert -- embodiment of the --.

In Column 4, Lines 11-12, please delete "embodiment the" and insert -- embodiment of the --.

In Column 4, Lines 21-22, please delete "embodiment the" and insert -- embodiment of the --.

In Column 6, Line 2, please delete "terminal post" and insert -- terminal post. --.

In Column 13, Line 21, please delete "embodiment the" and insert -- embodiment of the --.

In the Claims

In Column 15, Line 28, in Claim 7, please delete "post and" and insert -- post, and --.

In Column 16, Lines 33-34, in Claim 19, please delete "post bolt is" and insert -- post is --.

In Column 17, Line 21, in Claim 24, please delete "lithium ion battery" and insert -- lithium-ion battery module --.

Signed and Sealed this
Twenty-ninth Day of October, 2019

Andrei Iancu
*Director of the United States Patent and Trademark Office*